United States Patent [19]

Vassallo et al.

[11] Patent Number: 4,826,028

[45] Date of Patent: May 2, 1989

[54] GASKET SEATING RING

[75] Inventors: Efrain D. Vassallo; Jose E. Valls, both of Ponce, P.R.

[73] Assignee: Vassallo Research & Development Corp., P.R.

[21] Appl. No.: 867,610

[22] Filed: May 27, 1986

Related U.S. Application Data

[62] Division of Ser. No. 712,718, Mar. 18, 1985, Pat. No. 4,625,383.

[51] Int. Cl.⁴ .................... F16J 15/10; F16L 19/07
[52] U.S. Cl. .................... 277/207 A; 277/DIG. 2; 285/110; 285/234; 285/345; 285/379; 425/393; 425/DIG. 218
[58] Field of Search .............. 425/392, 393, 457, 517, 425/403, 388, 387.1, 389, DIG. 218; 277/207 A, 208, 152, DIG. 2; 29/423, 451, 450, 445; 285/110, 231, 234, 345, 379; 264/249, 322, 571, 519

[56] References Cited

U.S. PATENT DOCUMENTS

| Re. 27,736 | 8/1973 | Muhlner et al. | 264/571 |
|---|---|---|---|
| 1,924,020 | 8/1933 | Bihet | 277/207 A |
| 3,372,942 | 3/1968 | Carter | 277/207 A |
| 3,425,093 | 2/1969 | Ansette | 425/389 |
| 3,520,047 | 7/1970 | Muhlner et al. | 29/423 |
| 3,793,427 | 2/1974 | Heisler | 264/249 |
| 3,807,027 | 4/1974 | Heisler | 29/423 |
| 3,823,216 | 7/1974 | Petzetakis | 264/571 |
| 4,134,949 | 1/1979 | McGregor | 264/519 |
| 4,181,698 | 1/1980 | Hayes et al. | 264/249 |
| 4,206,538 | 6/1980 | Hayes et al. | 29/450 |
| 4,218,208 | 8/1980 | Hayes et al. | 425/388 |
| 4,223,896 | 9/1980 | Strom | 285/345 X |
| 4,266,926 | 5/1981 | Gordon | 425/387.1 |
| 4,275,909 | 6/1981 | Yoshizawa et al. | 285/345 X |
| 4,299,412 | 11/1981 | Parmann | 285/110 |
| 4,336,014 | 6/1982 | Parmann | 425/403 |
| 4,343,480 | 8/1982 | Vassallo | 277/207 A |
| 4,572,523 | 2/1986 | Guettouche et al. | 285/231 X |
| 4,579,354 | 4/1986 | Vassallo et al. | 277/207 A |
| 4,602,792 | 7/1986 | Andrick | 285/379 X |
| 4,637,618 | 1/1987 | Valls | 277/207 A X |
| 4,643,658 | 2/1987 | Gordon | 425/393 X |

FOREIGN PATENT DOCUMENTS

| 2015656 | 10/1971 | Fed. Rep. of Germany. | |
| 0027667 | 3/1978 | Japan | 264/322 |

Primary Examiner—Richard L. Chiesa
Attorney, Agent, or Firm—Steele, Gould & Fried

[57] ABSTRACT

A gasket seating ring is disclosed which includes a specially designed hard plastic ring. The hard plastic ring in molded as a shaped annulus having a rearward, radially outwardly inclined ramp and a joined, forward, radially inwardly inclined ramp wherein the junction between the rearward and forward ramps defines the outer periphery of the ring. The shaped annulus further includes a radially inwardly angular junction.

9 Claims, 5 Drawing Sheets

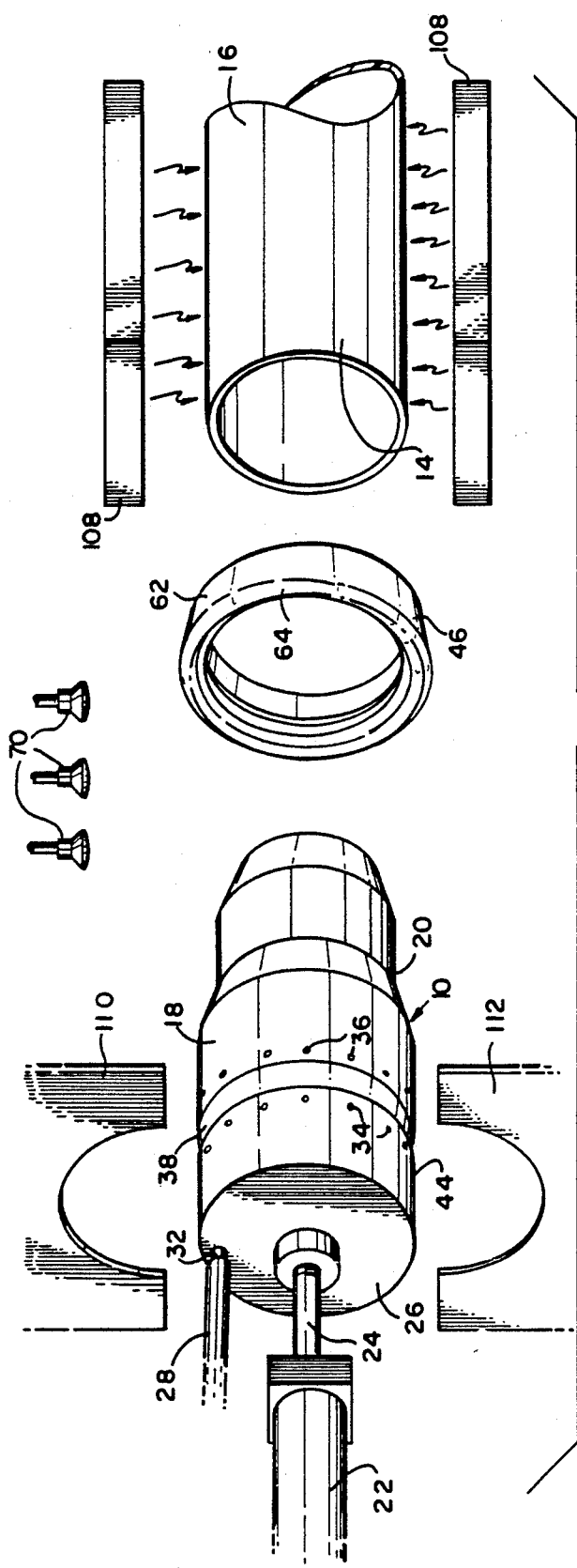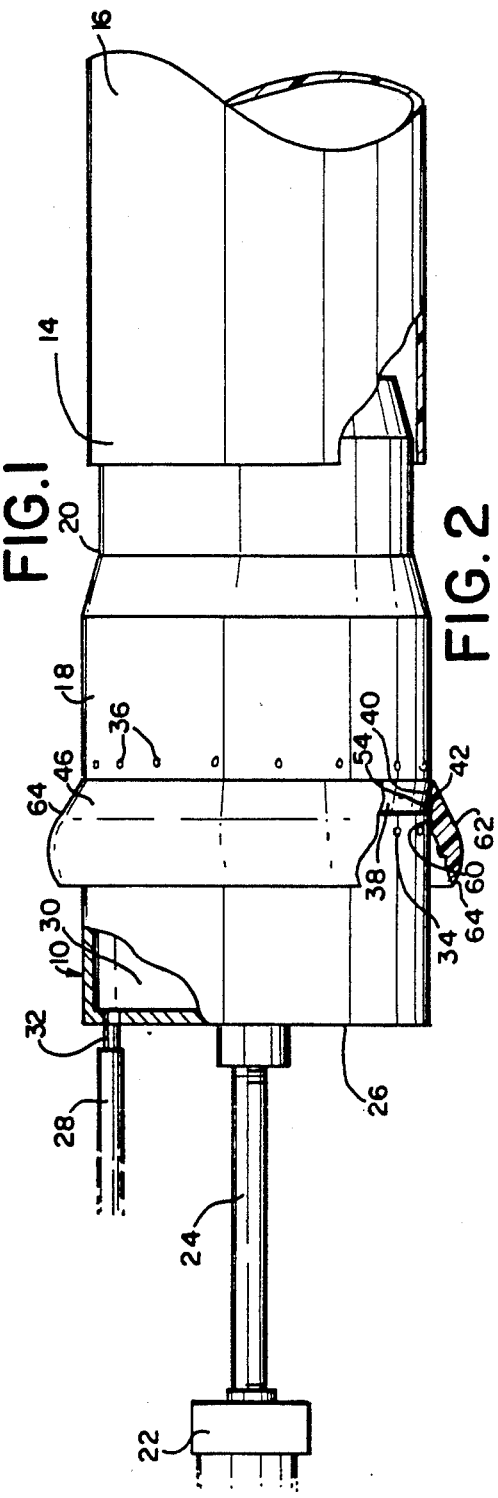

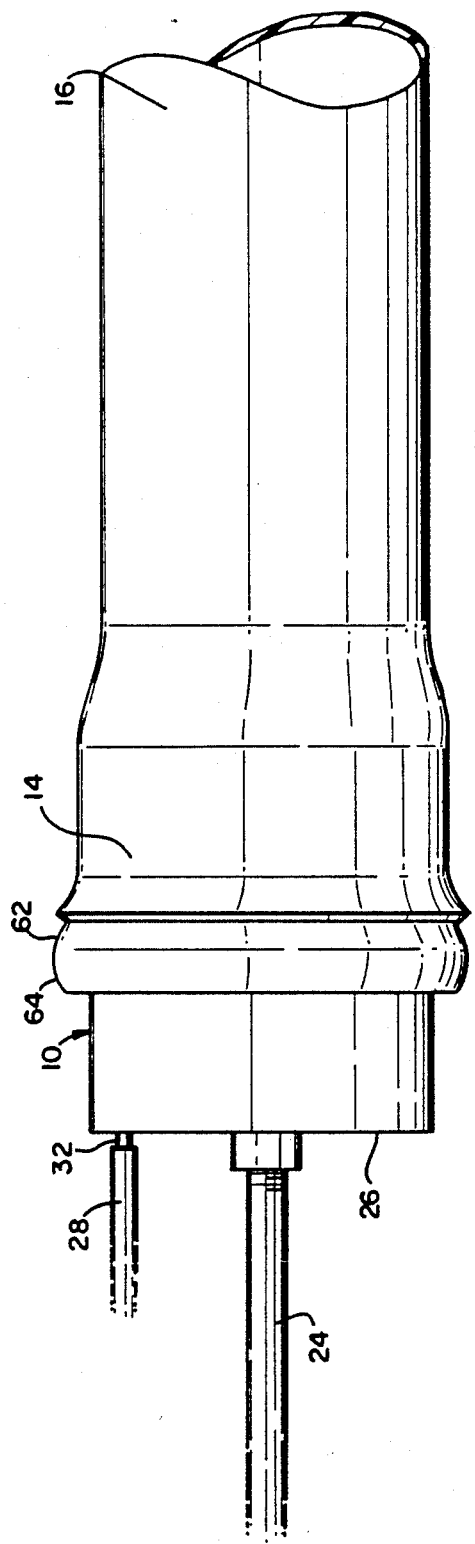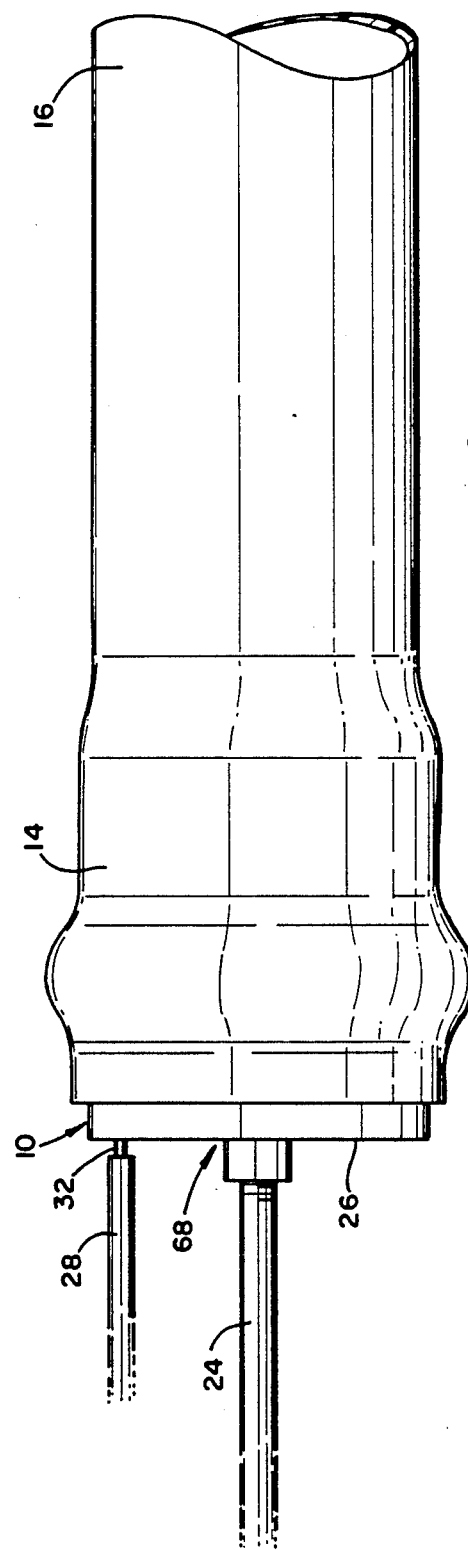

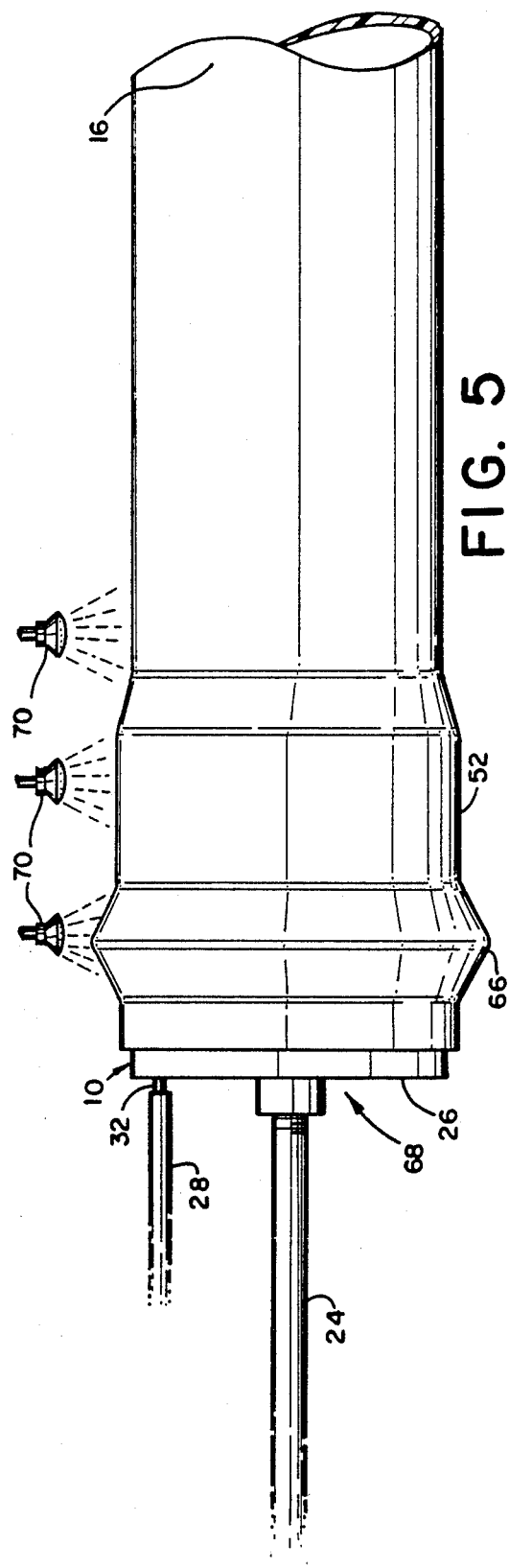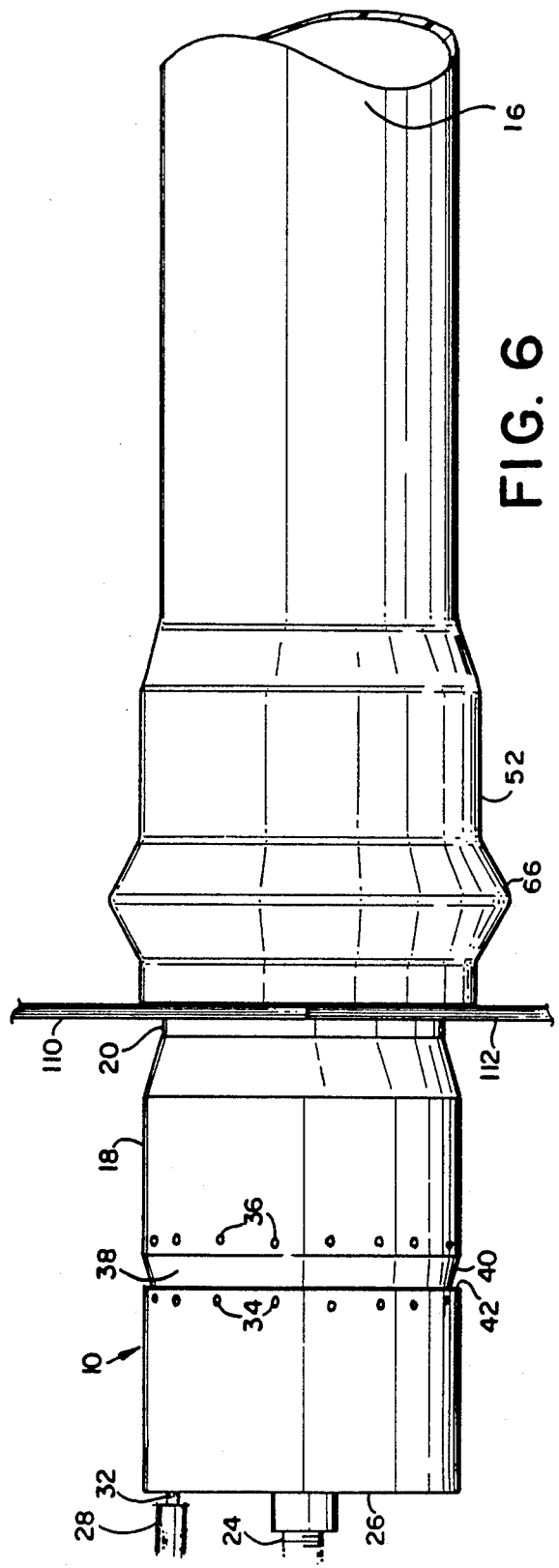

GASKET SEATING RING

This is a division of application Ser. No. 712,718, filed Mar. 18, 1985, now U.S. Pat. No. 4,625,383.

BACKGROUND OF THE INVENTION

1. Field of the Invention

The present invention relates generally to the field of mechanical equipment suitable for forming bells or sockets in one end of lengths of plastic pipe to permit joining adjacent lengths of plastic pipe in end to end juxtaposition by inserting the unbelled or spigot end of one length of pipe into the bell or socket which is formed in the proximate end of the adjacent length of pipe.

2. Description of the Prior Art

In prior art types of pipe belling equipment, it has been known to position a shaped mandrel of predetermined configuration and size within a belling machine and to serially advance discrete lengths of plastic pipe, each having one end preheated, into axial alignment with the belling mandrel. Suitable operating mechanisms have been developed and have been utilized to either axially move the pipe onto and over the mandrel, or alternately, to axially move the mandrel into the preheated end of the pipe for pipe end shaping into the desired bell or hub-shaped configuration. In certain designs, the prior pipe belling operations have been conducted within a suitable environmental chamber where suction forces or pressure forces could be introduced into the chamber to surround the pipe and thereby pull or press the preheatd, softened pipe walls uniformly against the outer periphery of the mandrel.

In accordance with more recent popular practice, it has become increasingly important to provide an internal groove in the bell configuration when the bell or hub shape was formed to provide a convenient annular internal groove for seating therein a resilient gasket in a manner to facilitate the making up of a leak proof junction between adjacent lengths of pipe in a piping system. Mandrel constructions have been developed by prior workers in the art which are capable of forming a circular, internal groove in the hub configuration for receipt of a gasket therein when the bell or hub of the plastic pipe was being formed.

However, so far as in known to the present applicants, despite all of the efforts of the many prior workers in the field to improve the joining procedures and constructions when utilizing plastic pipes, the proper and permanent seating of a sealing gasket in the junction between the spigot end of one length of pipe and the hub end of the next adjacent length of pipe, either with or without a peripheral internal groove formed in the hub, usually present field problems, and this is especially true in large diameter work. Particularly, in many designs the gaskets have been subject to displacement or "fishmouthing" when the joint was being formed. In other instances when the system was operated under pressure, gasket blow out could frequently occur in the event of pressure surges in the line.

In the plastic pipe industry, it is the common practice to provide a rubber or other elastomeric material gasket to form the seal between adjacent pipe sections or at the junction between a pipe and a fitting. Such gaskets have been configured and designed to facilitate the making up of the pipe joint in the shortest possible period of time in a manner to prevent leakage at the joint upon completion of the system. As the design operating pressures in a piping system increase, the difficulties encountered in providing an efficient and reliable seal have also increased.

In efforts to solve the sealing problems at pipe joints which are inherent in pressure or vacuum piping systems, prior workers in the art have developed gaskets of the type including one or more radially inwardly extending lips to press against the spigot end of the connected section of pipe. Additionally, other workers have provided gaskets having an internal peripheral groove within which is seated a locking ring of relatively hard plastic material to prevent movement of the seal as the joint is made up and to discourage gasket blow out when surges in system pressure occurred. In other efforts to prevent unseating of the gasket when the pipe joint was made up or to aid in preventing gasket blow out under severe pressure conditions of use, prior workers have also attempted to develop means to lock the gasket within an annular groove which could be formed in the plastic material of the bell during the bell forming operation.

In U.S. Pat. No. 4,343,480, entitled "Pipe Bell and Gasket", which patent is owned by the assignee of the present application, there is disclosed a bell and spigot connection for plastic pipes. The patented design employs a gasket groove in the hub and a gasket seated within groove and having a pair of longitudinally spaced, radially inwardly extending lips. The gasket may be utilized either with or without a hard plastic retaining ring intermediate the lips. In the patented configuration, the exterior or entrance end of the hub was radially inwardly bent after the gasket was seated in the peripheral, inwardly open groove which was formed in the hub to thereby retain the gasket within the groove in a manner to prevent gasket blow out upon surges in system pressure.

It has been found that the prior art hub and gasket constructions were particularly difficult to form to precise tolerances and this was especially true in large diameter work wherein the very thickness of the large diameter pipe sidewall constructions resisted efforts to satisfactorily develop the machinery and techniques necessary to form the configurations of bells and gasket grooves within the tolerances required to assure proper gasket performance both when the joint was made up and after the piping system was pressured. The need remains to provide a functional, reliable gasket seating arrangement for the bells of plastic pipes.

As used herein, the term "large diameter" is defined to mean plastic pipes having an inside diameter of ten inches and larger.

SUMMARY OF THE INVENTION

The present invention relates generally to the field of belling mandrels, and more particularly, is directed to a mandrel and method for using the mandrel to form pipe bells in a manner to both impress a desired hub-shaped profile in one preheated end of a length of plastic pipe and simultaneously to position and secure a hard plastic insert or ring in the hub constuction.

The belling mandrel of the present invention includes a body of generally cylindrical configuration which is forwardly configured in known manner to a shaped profile or nose to form the desired bell shape in one preheated end of a length of plastic pipe. In accordance with usual practice, a plurality of plastic pipes can be extruded, cut to length, and automatically and successively fed to the mandrel in known manner by employing large, automatic, pipe belling machines. It is the primary object of this invention to apply a hard plastic or other suitable material ring over the mandrel body just prior to belling and then to form the bell or socket in the pipe end about the ring in a manner whereby the ring will shape an annular pocket in the bell and will become encapsulated therein following the belling procedures.

The hard plastic ring is radially inwardly configured to engage and interlock within a cooperating groove which is formed in the mandrel body to prevent unseating during the belling operation. The interior configuration of the ring additionally is designed to securely seat a resilient gasket therein in the manner hereinafter more fully set forth. The outer periphery of the hard ring slopes or ramps radially outwardly from its trailing edge to form a peripheral inclined surface. In this manner, the ring outer periphery serves as a circular ramp or slope to direct the heated pipe end over the ring when the pipe end is shaped upon the mandrel.

The hard plastic ring will hereinafter be referred to as the "EPSMI" ring, an acronym for an extruded pipe socket molded insert. The EPSMI ring of the present invention may be molded or otherwise formed of a suitable hard plastic such as polypropylene plastic or perhaps polyethylene plastic and can be formed by molding or otherwise to the exact configuration and dimensions as necessary to properly seat and retain a gasket, a heretofore almost impossible achievement when mandrel forming the sockets of large diameter plastic pipes.

The EPSMI ring of the present invention is particularly interiorly formed to seat a resilient gasket of generally U-shaped or other cross sectional configuration. In the preferred embodiment, the gasket will be of the type wherein an annular, radially inwardly open groove is defined to receive therein a retaining ring of relatively hard plastic material, for example, a ring of molded polypropylene plastic. The preferred gasket construction comprises a circular arched base, a front, radially inwardly projecting leg or flange and a rearward, radially inwardly projecting leg or flange of thicker material. The front leg terminates radially inwardly to define a leading lip of suitable inner diameter to be conventionally employed to center and to initially wipe the outer periphery of the spigot end of the adjacent pipe section as the bell and spigot joint is being formed in the field. The thicker rear leg of the gasket terminates radially inwardly to define a sealing lip of inner diameter that is designed to press against and seal against the outer periphery of the spigot end of the adjacent pipe section to provide a leak-tight, easily made up junction.

The hard plastic retaining ring and the thicker rear leg of the gasket are especially designed and utilized to prevent unseating of the gasket when the parts are joined together and to discourage gasket blow out after the system is pressurized and in use. In a preferred embodiment, the gasket utilized in conjunction with the EPSMI ring can be similar to the gasket disclosed in our copending application, Ser. No. 678,494, filed Dec. 7, 1984 entitled "Gasket" now U.S. Pat. No. 4,579,354 dated Apr. 1, 1986. As hereinafter set forth, gaskets of other configurations can also be utilized in accordance with the teachings of the present invention. The resilient gaskets employed in this invention are particularly adaptable to be secured in the EPSMI ring following the belling operations and are frictionally retained between portions of the inner periphery of the EPSMI ring and the expanded groove or circular pocket which is formed in the socket by the ring during the belling operation.

The body of the mandrel utilized in this invention is hollow in order to provide for the introduction of a vacuum therewithin. The hollow mandrel interior or vacuum chamber is provided with vacuum introduction means and a plurality of vacuum openings which can be positioned to apply suction forces interiorly of the heated end of the plastic pipe. These vaccum openings serve to pull the plastic pipe into intimate overall contact with the outer periphery of the mandrel and the EPSMI ring while the bell-shaped configuration is being formed in the pipe end and to simultaneously encapsulate or entrap the hard plastic ring within the bell-shaped end. Preferably, the vacuum openings are circumferentially spaced forwardly and rearwardly of the ring retaining groove to equally apply the suction forces about the hard plastic ring. The vacuum forces acting through the plurality of vacuum openings pull the softened pipe end into overall, intimate contact with the outer peripheries of the hard plastic ring and the mandrel by applying uniform suction forces interiorly of the pipe to improves the desired bell-shaped configuration in the plastic pipe with the plastic ring secured therein. It is noteworthy that the hard EPSMI ring provides an additional pipe end shaping function in conjunction with the shaping function of the mandrel whereby the heated end of the pipe will assume the shape of the mandrel with the outer peripheral shape of the hard plastic ring superimposed therein. The sharply defined interior configuration of peripheral surfaces of the EPSMI ring can then provide the required cooperating surface configurations within the required tolerances to receive and retain a resilient gasket therein.

It is therefore an object of the present invention to provide a novel method and apparatus for seating a gasket in a plastic pipe bell of the type set forth.

It is another object of the present invention to provide an improved method and apparatus for seating a gasket in a plastic pipe bell including a mandrel having body groove means to receive a hard plastic ring on the outer periphery thereof, means to apply a heated end of a length of plastic pipe over the hard plastic ring and means to urge the pipe into overall intimate contact with the outer periphery of the mandrel and the ring to entrap the hard plastic ring within the bell-shaped end.

It is another object of the present invention to provide an improved method and apparatus for seating a gasket in a plastic pipe bell including a mandrel construction comprising a body, a shaped nose affixed to the body, a peripheral, shaped groove formed in the body, an EPSMI ring having a ramped outer periphery seated within the shaped groove and means to draw a preheated end of a length of plastic pipe into intimate, overall contact with the outer peripheral surface of the mandrel and the outer peripheral surface of the EPSMI ring to impress a bell-shaped configuration in the pipe end and to permanently affix the ring within the shaped end of the pipe.

It is another object of the present invention to provide a novel method and apparatus for seating a gasket in a plastic pipe bell that is rugged in construction, automatic in operation and reliable when in use.

Other objects and a fuller understanding of the invention will be had by referring to the following description and claims of a preferred embodiment thereof, taken in conjunction with the accompanying drawings, wherein like reference characters refer to similar parts throughout the several views and in which:

BRIEF DESCRIPTION OF THE DRAWINGS

FIG. 1 is a partial, exploded, perspective schematic representation of the belling equipment of the present invention.

FIG. 2 is an enlarged, partial, side elevational view of the belling mandrel with an EPSMI ring seated thereon in a position just after entering the heated end of a length of plastic pipe, and partially broken away to expose interior construction details.

FIG. 3 is a side elevational view similar to FIG. 2 showing the belling mandrel urged further into the preheated end of the pipe.

FIG. 4 is a side elevational view similar to FIG. 3 illustrating the complete insertion of the belling mandrel in the preheated end of the pipe.

FIG. 5 is a side elevational view similar to FIG. 4 showing the pipe being cooled after the bell-shaped configuration has been completely formed.

FIG. 6 is a side elevational view similar to FIG. 5 showing the clamps in closed position to hold the pipe while the mandrel is withdrawn.

DESCRIPTION OF THE PREFERRED EMBODIMENT OF THE INVENTION

Figure 7:
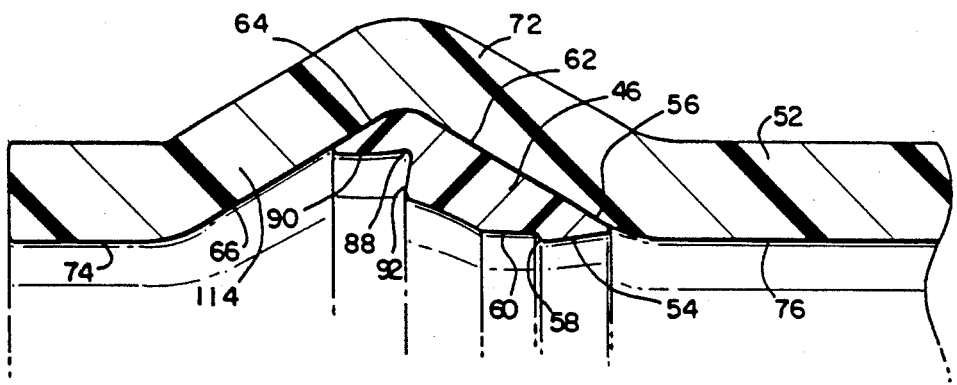
FIG. 7 is an enlarged, partial, cross sectional view showing the EPSMI ring encapsulated in the circular pocket.

Although specific terms are used in the following description for the sake of clarity, these terms are intended to refer only to the particular structure of the invention selected for illustration in the drawings, and are not intended to define or limit the scope of the invention.

Referring now to the drawings, there is illustrated in FIGS. 1 and 2 a mandrel 10 of the type utilized to form a bell-shaped configuration in one preheated end 14 of a length of plastic pipe 16. In accordance with the most common practice, the pipe 16 is preferably extruded in known manner from polyvinylchloride pellets and is cut into discrete lengths such as ten, thirteen or twenty feet prior to introduction to a pipe belling machine comprising a belling mandrel. The mandrel 10 comprises generally a hollow cylindrical body portion 18 of diameter greater than the outer diameter of the pipe 16 and a shaped, hollow profile or nose portion 20. As illustrated, a hydraulic cylinder 22 is provided in longitudinal axial alignment with the mandrel 10 and has a reciprocating arm 24 secured to the mandrel rear wall 26 to reciprocate the mandrel 10 in known manner in response to activation of the hydraulic cylinder 22. A vacuum hose 28 communicates with the hollow interior 30 of the mandrel 10 through a conventional air fitting 32 to introduce vacuum forces within the interior cavity 30 of the mandrel from a suitable known vacuum source (not illustrated) to aid in shaping the bell as hereinafter more fully described.

As best seen in FIGS. 1 and 2, the mandrel body portion 18 is equipped with a plurality of similar, circularly spaced, vacuum openings 34, 36 to facilitate the application of vacuum forces peripherally exteriorly of the mandrel 10 for EPSMI ring encapsulating purposes in the manner hereinafter more fully set forth. A peripheral groove 38 is formed in the exterior periphery of the mandrel body 18 intermediate its ends and the groove comprises a circular seating face 40 which inclines radially inwardly from the mandrel front or profile portion 20 toward the mandrel rear and a locking face 42 which extends radially outwardly from the rearward extent of the seating face 40 to the peripheral surface 44 of the mandrel body portion 18.

Still referring to FIGS. 1 and 2, an EPSMI ring 46 is illustrated which is molded or otherwise formed of a hard, essentially non-shrinkable plastic, such as polypropylene plastic. The ring 46 is particularly configured to be either manually or automatically applied to the mandrel 10 prior to the pipe belling operation and has its interior peripheral surfaces particularly configured and designed to secure a gasket 48 (FIG. 8) or 50 (FIG. 10) within the pipe bell 52 (FIG. 9) formed in one end of the length of pipe 16 as hereinafter more fully set forth.

As best seen in FIGS. 2 and 7, the EPSMI ring is configured as a shaped annulus and comprises generally a radially inwardly facing annular seat 54. The seat 54 inclines inwardly from the trailing edge 56 to a locking shoulder 58 and conforms in diameter, length and inclination to the configuration of the peripheral mandrel groove 38. By applying the ring 46 over the mandrel body 18 and urging it forwardly with sufficient force, the ring will be temporarily stretched sufficiently to allow the annular seat 54 to slide over the mandrel body and snap into and lock within the mandrel groove 38. A bearing section 60 extends forwardly from the seat 54 and is formed of suitable diameter to rest and bear directly upon the outer periphery of the mandrel body portion 18. A rearward, radially outwardly inclined ramp 62 and a forward, partial, radially inwardly inclined ramp 64 define the outer periphery of the ring 46. The ramps 62, 64 define a circular outer ring periphery that is greater in diameter than the diameter of the outer periphery of the gasket 48 or 50 and are utilized to extend the bell diameter sufficiently to facilitate placement of the gasket after the bell configuration has been formed and the mandrel removed.

With the EPSMI ring 46 seated and locked within the mandrel groove 38, the mandrel 10 can then be reciprocated upon activation of the cylinder 22 to enter the pipe and to urge the heated end 14 of the pipe 12 over the shaped profile portion 20 of the mandrel and over the outer periphery of the mandrel body portion 18. See FIGS. 2 and 3. As illustrated in FIG. 4, the forward end of the preheated pipe end portion 14 will expand over the rearward ramp or slope 62 and over and down the forward ramp or slope 64 to form a radially outwardly expanded groove 66 in the pipe socket or bell shaped configuration 52. The pipe end 16 will thus be expanded over the EPSMI ring 64 to form a seating space for a gasket 48,50, which gasket can then be applied to the bell 52 once the mandrel has been reciprocated to its initial position. As illustrated in FIG. 4, the outer configuration of the pipe end about the ring 46 will not be well defined at this stage in view of the thickness of the pipe sidewall construction.

A plurality of functioning vacuum openings 34, 36 extend radially outwardly through the mandrel body portion 18 on each side of the peripheral ring retaining groove 38 to communicate the interior of the operating cavity 30 with the atmosphere immediately surrounding the mandrel 10. By applying suction forces within the operating cavity 30, for example by utilizing a vacuum hose 28 and air fitting 32 in a manner well known to those skilled in the art, the suction forces can be imposed interiorly of the heated pipe end 14 to draw the interior periphery of the pipe tightly against the outer periphery of the mandrel 10 and about the outer rearwardly and forwardly ramped periphery 62, 64 of the EPSMI ring 46. See FIGS. 5 and 6. Optionally, in lieu of employing suction within the operating cavity 64 to apply vacuum forces through the suction openings 34, 46, the mandrel could possibly be positioned within a pressure chamber to thereby press the preheated end 14 of the pipe 16 against the mandrel 10 and over and about the EPSMI ring 46. In either event forces other than atmospheric cause the heated pipe end 14 into intimate contact with the mandrel 10 and the ring 46, thereby providing a very well defined shape in the socket or pipe bell 52.

In order to use the reciprocating mandrel 10 of the present invention to impress a bell shape 52 in one end 14 of a length of pipe 16, the pipe end 14 is first rotated within a suitable heater 108 in a manner well known to those skilled in the art for a sufficient period of time to become pliable enough to permit the bell formed operations to take place. While the pipe end 14 is being heated, an EPSMI ring 46 can be manually applied over the mandrel profile and body portions 20, 18 and can be secured in the proper position by forcing the ring annular seat 54 into the mandrel peripheral grooves 38. A hydraulic cylinder 22 or other type of exterior operator which is employed to reciprocate the operating arm 24 is then functioned to push the operating arm 24 rearwardly to rearwardly move the mandrel 10 to its rearward, belling position 68. See FIG. 4 and FIG. 5. In this position, the previously softened pipe end 14 will be urged over the mandrel profile portion 20 and will be radially outwardly expanded over the mandrel body portion 18 and outwardly and about the EPSMI ring ramp surfaces 62, 64 until the outer periphery of the pipe end 14 approximates the combined outer peripheries of the mandrel profile portion 20, the mandrel body portion 18 and the seated EPSMI ring 46.

While it is contemplated at the present time that the hard plastic EPSMI ring 46 will be positioned upon the mandrel 10 by employing manual operations, it is expected that this operation can be and may be automated whereby the ring 46 can be automatically applied over the mandrel profile and seated within the groove 38 prior to the initiation of the belling cycle.

Once the mandrel 10 is urged to its rearward, belling position 68, forces other than atmospheric are then employed to pull or press the heated end 14 of the pipe 16 into intimate, overall contact with the outer periphery of the mandrel and the outer periphery of the ring 46. In the illustrated embodiment, it is contemplated that suction forces will be introduced through the vacuum hose 28, within the hollow interior mandrel cavity 30 and these suction forces, operating through the plurality of vacuum or suction openings 34, 36 will cause the pipe end 14 to be pulled into intimate overall contact with the mandrel profile 18, 20 and the associated EPSMI ring 46. The shape of the pipe end will be varied by the suction forces from the rather slack exterior periphery without well defined angles, as illustrated in FIG. 4, to the well defined peripheral shape as best seen in FIGS. 5 and 6.

With the parts in the position illustrated in FIG. 5, the end 14 of the pipe 16 can then be cooled rapidly in known manner, for example by applying a cooling liquid through a plurality of nozzles 70 to set the plastic in the desired bell-shaped configuration and to encapsulate the hard plastic ring 46 within a radially expanded annular pocket 72 which has thus been formed in the pipe end. Once the pipe end has cooled and with the EPSMI ring encapsulated within the expanded ring shape 72, the mandrel 20 can then be removed axially from the pipe bell shaped configuration 12 in known manner by activation of the cylinder 22. A pair of opposed clamps 110, 112 of half circle configuration are then moved from their open position as illustrated in FIG. 1 to their closed position as shown in FIG. 6 to hold the pipe end in the fixed position while the mandrel 10 is hydraulically pulled out. The belling operation can be repeated with the next serially advancing length of plastic pipe. (Not shown). It is noteworthy that the groove locking face 42 interacts with the ring locking shoulder 58 to prevent unseating of the EPSMI ring during the belling operation when the mandrel 10 is urged within the preheated end 14 of the pipe length 16 and the inclined seating face 40 functions to permit the inclined annular seat 54 of the ring to slip off of the mandrel when the clamps 110, 112 are closed and the mandrel is withdrawn from the forward pipe bell.

Figure 9:
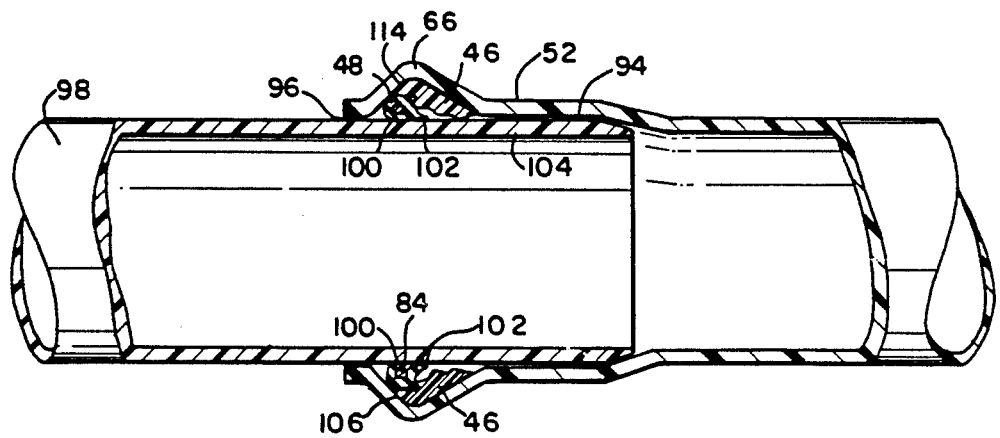
FIG. 9 is a side elevational view of pipe junction on reduced scale illustrating a spigot end inserted into the formed bell and partly in section to show interior construction details.

As illustrated in FIG. 9, the operation of the reciprocating mandrel 10 of the present invention with the ring 46 seated thereon produces a finished, bell shaped configuration 52 in one end 14 of a length of plastic pipe 16 with an EPSMI ring 46 permanently secured therein to facilitate receiving a resilient gasket 48, 50 suitable for making up the junction between adjacent lengths of pipe when a piping system (not illustrated) is to be fabricated. It will be appreciated that the operation of the hydraulic cylinder 22, the suction forces through the vacuum hose 28 and vacuum openings 34, 36, the movement of the mandrel 10 axially into and out of the pipe end 14, the opening and closing of the claims 110, 112 and the function of the spray nozzles 70 can be automated in well known manner to provide a completely automatic, cyclical operation that is capable of successively belling a plurality of plastic pipes as they are serially advanced to the belling mandrel. Additionally, as above set forth, if desired, it would also be possible to automate the placing of the EPSMI ring upon the mandrel at the start of each belling cycle.

Experience has shown that the nozzles 70 will only partially cool the shaped bell 52 and when the mandrel 10 has been reciprocated outwardly of the bell shaped configuration 52, the pipe end 14 will continue to be cooled through contact with the cooler ambient air. The natural memory of the plastic material of the pipe will cause the bell shaped configuration to shrink and tend to attempt to return to the initial unexpanded shape. This shrinkage further acts to lock the EPSMI ring within the bell shaped configuration. Upon removal of the mandrel, the added shrinkage of the bell shaped socket 52 will occur both forwardly and rearwardly of the ring 46 (without shrinking the ring 46) to thereby produce a forward inner diameter section 74 and rearward inner diameter section 76 that is less than the inner diameter of the ring annular seat 54. It will be noted that due to the hardness of the polypropylene plastic material which comprises the ring 46, there will be no tendency of the ring to either expand or shrink during any of the belling operations. Rather, the dimensions of the ring 46 remain essentially the same throughout the belling cycle, thereby providing the exact shaped profile required for optimum gasket seating.

Figure 8:
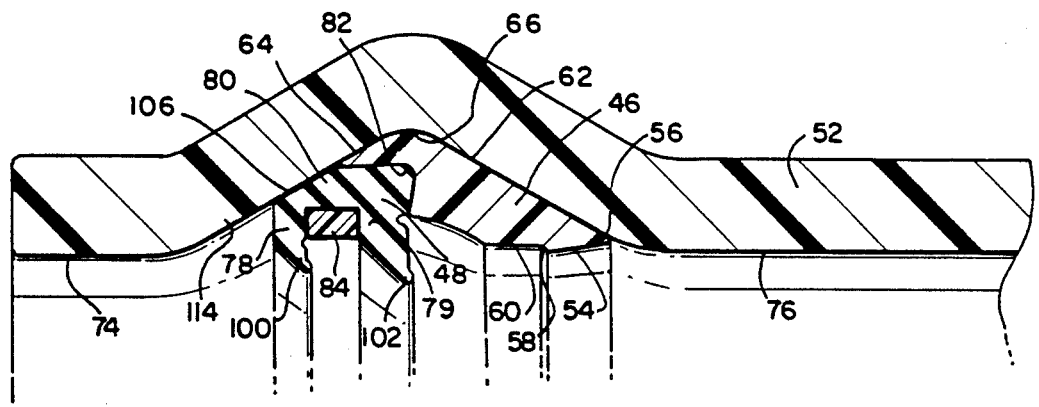
FIG. 8 is an enlarged, partial, sectional view similar to FIG. 7 illustrating a resilient gasket secured between the ring and a forward wall of the pocket.

As illustrated in FIGS. 8 and 9, the EPSMI ring 46 is illustrated in use with a resilient gasket 48, which gasket is characterized by a generally U-shaped configuration comprising a relatively thin forward or wiping flange 78, a relatively thick sealing flange 79 and a relatively thick base or web 80 which interconnects the legs or flanges 78, 79. The interconnection between the base 80 and the sealing flange 79 is formed to a thick, sturdy, sharp angular junction 82 which is especially adapted to avoid "fishmouth" or gasket dissociation when the pipe joint between adjacent lengths of pipe is made up. See FIG. 8. The gasket 48 may be similar to the gasket construction illustrated in our said copending application, Ser. No. 678,494 now U.S. Pat. No. 4,579,354 and may be used in conjunction with a polypropylene or other hard plastic retaining ring 84.

Referring to FIG. 7 and 8, the EPSMI ring 46 is configured to provide a forwardly facing, sharp angular junction 88 which defines an acute angle between the generally axially aligned interior wall 90 and the generally radially extending interior wall 92. The angular junction 88 is especially designed to receive and securely seat therein the thick seating corner 82 of the gasket 48 to thereby discourage unseating of the gasket by the stresses imposed when the pipe junction 96 between adjacent lengths of pipe 16, 98 is made up. As illustrated in FIG. 9, when the pipe junction 96 is formed, the gasket seating corner 82 remains associated within the ring angular junction 88 and the forward and rearward flange lips 100,102 will bend and seal against the outer periphery of the spigot end 104 of the adjacent pipe length 98. Simultaneously, the gasket 48 will have its sealing corner 106 tightly pressed into sealing engagement against the forward interior wall 114 of the expanded groove 66 to additional function to assure a leak-proof junction between the parts. As illustrated, the bent flange lips serve to assure a concentric annular clearance space 94 between the spigot end 104 and the pipe bell 52.

Figure 10:
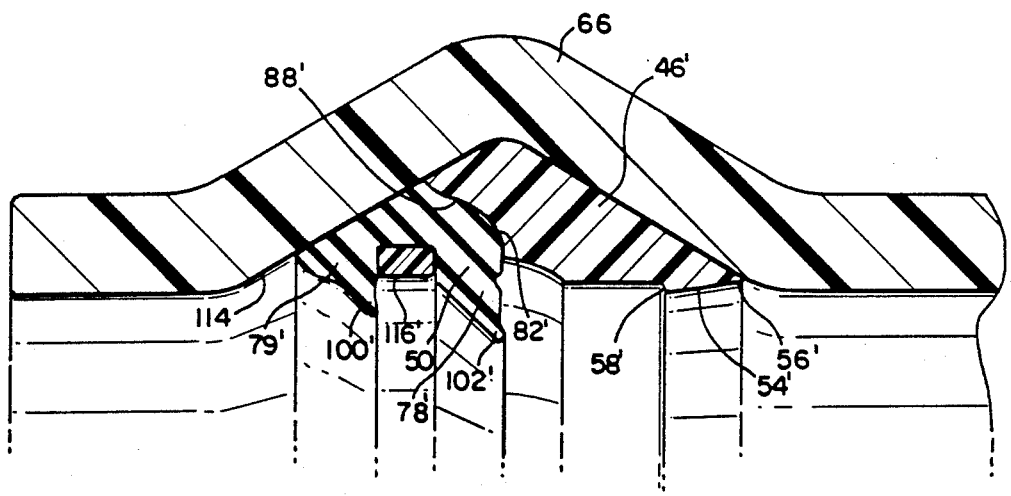
FIG. 10 is an enlarged, partial sectional view similar to FIG. 8 showing a modified hard plastic ring and a modified gasket construction.
Figure 11:
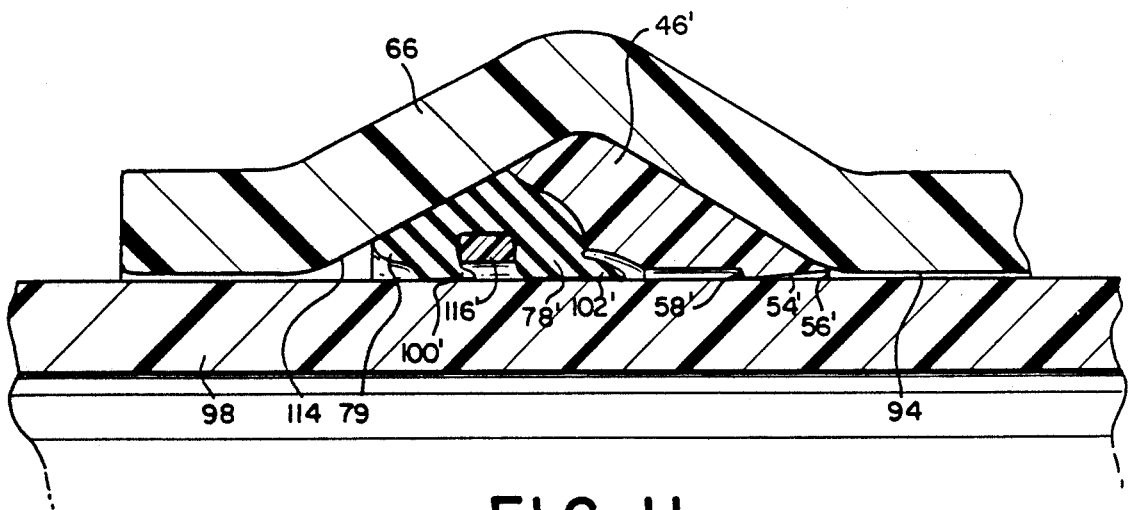
FIG. 11 is a sectional view similar to FIG. 10 showing the spigot end of an adjacent pipe length in sealing engagement with the enlarged socket.

In FIGS. 10 and 11 there is illustrated a modified EPSMI ring 46' and modified gasket 50 wherein the ring 46' is molded or otherwise formed to provide a reversely curved securing junction 88'. As shown, the modified gasket 50 is molded or otherwise formed to define a similarly configured, relatively thick seating shoulder 82'. The interaction between the securing junction 88' and the seating shoulder 82' functions to prevent gasket displacement when the pipe joint is made up. As illustrated, the forward and rearward sealing lips 100',102' of the flanges 79',78' bend as necessary to tightly seal against the spigot end of the adjacent pipe section 98 to provide a leakproof junction when the system is pressurized. As illustrated, the modified EPSMI ring 46' is similarly formed to fit within the mandrel groove 38 and comprises an annular seat 54' defined between the trailing edge 56' and the locking edge 58'. If desired, a hard plastic annular locking ring 116' can be employed to additionally insure proper gasket seating.

Figure 12:
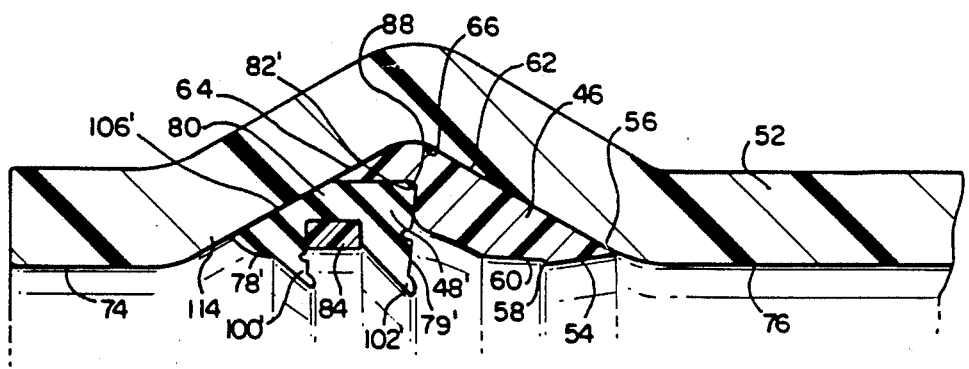
FIG. 12 is an enlarged, partial, sectional view similar to FIG. 8 showing a modified gasket construction.

In the embodiment illustrated in FIG. 12, the EPSMI ring 46 is similarly configured to provide a forwardly facing, sharp angular junction 88 which defines an acute angle for securely seating the modified gasket 48'. The angular junction 88 is especially designed to receive and securely seat therein the thick seating corner 82' of the modified gasket 48' to thereby discourage unseating of the gasket by the stresses imposed when the pipe junction between adjacent lengths of pipe 16, 98 is made up. In the manner hereinbefore described, when the pipe junction is formed, the gasket seating corner 82' will remain associated within the ring angular junction 88 and the forward and rearward flange lips 100',102' of the forward and rearward flanges 78',79' will bend and seal against the outer periphery of the spigot end 104 of the adjacent pipe length 98. Simultaneously, the modified gasket 48' will have its thicker sealing corner 106' tightly pressed into sealing engagement against the forward interior wall 114 of the expanded groove 66 to additional function to assure a leak-proof junction between the parts. The enlarged sealing corner 106' of this embodiment provides additional strength and additional sealing capability between the gasket 48' and the forward interior wall 114.

Although the invention has been described with a certain degree of particularly, it is understood that the present disclosure has been made only by way of example and that numerous changes in the details of construction and the combination and arrangement of parts may be resorted to without departing from the spirit and scope of the invention. Thus, the scope of the invention should not be limited by the foregoing specification, but rather, only by the scope of the claims appended hereto.

What is claimed is:

1. A hard ring for seating a resilient gasket in the bell of a length of plastic pipe having an inner periphery of predetermined interior diameter, a belled end and central axis comprising a hard plastic, shaped, non-resilient annulus, the shaped annular comprising a radially inwardly facing annular seat, the seat having a leading edge, a trailing edge a non-resilient seating surface defined between the leading edge and the trailing edge, the seating surface having a diameter substantially equal to the interior diameter of the pipe, the shaped annulus further comprising a rearward, radially outwardly inclined ramp extending forwardly from the trailing edge of the seat and a joined forward, partial, radially inwardly inclined ramp, the junction between the rearward and forward ramps defining the outer periphery of the hard ring, the shaped annulus being configured to define a radially inwardly opening junction, the junction being defined by walls of hard, plastic material, the said forward, partial, radially inwardly inclined ramp terminating radially outwardly of the said inner periphery of the pipe to define a forwardly open annular path to the said radially inwardly open junction of size to receive portions of the resilient gasket therein, the diameter of the annular path being larger than the diameter of the inner periphery of the pipe;

whereby the resilient gasket may be readily applied to the hard ring at the forwardly open path by positioning a portion of the gasket in peripheral contact with the said radially inwardly open junction.

2. The hard ring of claim 1 wherein the said radially inwardly open junction comprises a substantially radially extending wall and an axially extending wall, the said walls intersecting to form an angular junction of substantially ninety degrees.

3. The hard ring of claim 2 and a resilient gasket in contact with the radially extending wall and the axially extending wall of the said radially inwardly open junction.

4. The hard ring and resilient gasket of claim 3 wherein the resilient gasket is generally U-shaped in cross sectional configuration, the resilient gasket comprising a relatively thin, forward, wiping flange, a relatively thick, rearward sealing flange and a relatively thick base interconnecting the forward wiping flange and the rearward sealing flange.

5. The hard ring and resilient gasket of claim 4 wherein the said gasket base is rearwardly defined by a thick, sturdy, sharp, angular junction.

6. The hard ring and resilient gasket of claim 5 wherein the said gasket base is forwardly defined by a sealing corner comprising a sealing face that is angularly inclined relative to the central axis of the length of plastic pipe.

7. The hard ring and resilient gasket of claim 5 wherein the forward wiping flange and the rearward sealing flange define an annular space therebetween.

8. The hard ring and resilient gasket of claim 7 and a hard plastic retaining ring positioned within the said annular space.

9. The hard ring and resilient gasket of claim 8 wherein the said retaining ring contacts interior portions of the base, the forward wiping flange and the rearward sealing flange of the resilient gasket.

* * * * *